United States Patent
Watanabe et al.

(10) Patent No.: US 9,209,453 B2
(45) Date of Patent: Dec. 8, 2015

(54) NEGATIVE ELECTRODE ACTIVE MATERIAL FOR ELECTRIC DEVICE

(75) Inventors: Manabu Watanabe, Yokosuka (JP); Osamu Tanaka, Yokosuka (JP); Masao Yoshida, Zushi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/003,382

(22) PCT Filed: Mar. 6, 2012

(86) PCT No.: PCT/JP2012/055665
§ 371 (c)(1),
(2), (4) Date: Sep. 5, 2013

(87) PCT Pub. No.: WO2012/121240
PCT Pub. Date: Sep. 13, 2012

(65) Prior Publication Data
US 2013/0341560 A1  Dec. 26, 2013

(30) Foreign Application Priority Data

Mar. 8, 2011  (JP) .................................. 2011-050314
May 25, 2011  (JP) .................................. 2011-117073

(51) Int. Cl.
*C01B 31/36*   (2006.01)
*C22C 18/00*   (2006.01)
(Continued)

(52) U.S. Cl.
CPC .............. *H01M 4/364* (2013.01); *C01B 31/36* (2013.01); *C01B 33/06* (2013.01); *C22C 18/00* (2013.01); *C22C 28/00* (2013.01); *C22C 30/06* (2013.01); *H01M 4/386* (2013.01); *H01M 4/42* (2013.01)

(58) Field of Classification Search
CPC ......... H01M 4/42; H01M 4/134; H01M 4/38; H01M 4/364; C22C 18/00; C22C 30/06
USPC ............ 252/182.1, 519.1; 420/424, 578, 589, 420/557, 417
See application file for complete search history.

(56) References Cited

U.S. PATENT DOCUMENTS

2013/0122333 A1   5/2013   Obika et al.

FOREIGN PATENT DOCUMENTS

JP   2005-032687 A       2/2005
JP   2005158305 A   *   6/2005
(Continued)

OTHER PUBLICATIONS

Taiwanese Office Action, Feb. 21, 2014, 6 pages.
S. Yoon et al., "Electrochemical properties of Si-Zn-C composite as an anode material for lithium-ion batteries", Journal of Power Sources, Issue 2, vol. 167, Mar. 1, 2007, pp. 520-523.

*Primary Examiner* — Mark Kopec
*Assistant Examiner* — Danny N Kang
(74) *Attorney, Agent, or Firm* — Foley & Lardner LLP (57) ABSTRACT

A negative electrode active material for an electric device includes an alloy containing silicon in a range from 25% to 54% exclusive, carbon in a range from 1% to 47% exclusive, zinc in a range from 13% to 69% exclusive in terms of mass ratio, and inevitable impurities as a residue. For example, the negative electrode active material can be obtained with a multi DC magnetron sputtering apparatus by use of silicon, carbon and zinc as targets. An electric device using this negative electrode active material can improve the initial charge-discharge efficiency while keeping the cycle property.

6 Claims, 3 Drawing Sheets (51) Int. Cl.
- *H01M 4/36* (2006.01)
- *C22C 28/00* (2006.01)
- *C22C 30/06* (2006.01)
- *C01B 33/06* (2006.01)
- *H01M 4/38* (2006.01)
- *H01M 4/42* (2006.01)

(56) References Cited

FOREIGN PATENT DOCUMENTS

| | | |
|---|---|---|
| JP | 4406789 B2 | 11/2009 |
| JP | 2010-097922 A | 4/2010 |
| TW | 201208910 A1 | 3/2012 |

* cited by examiner

NEGATIVE ELECTRODE ACTIVE MATERIAL FOR ELECTRIC DEVICE

TECHNICAL FIELD

The present invention relates to a negative electrode active material for an electric device, as represented by a secondary battery and a capacitor, used as a power source for driving a motor for use in a vehicle such as an electric vehicle (EV) and a hybrid electric vehicle (HEV).

BACKGROUND ART

Various measures for reduction of emissions of carbon dioxide ($CO_2$) are being taken in order to deal with atmospheric pollution and global warming. In the automobile industry, the reduction of emissions of $CO_2$ is highly expected in association with the spread of electric vehicles and hybrid electric vehicles. Thus, development of electric devices such as secondary batteries for driving motors is actively being carried out.

Since a higher capacity and cycle property are particularly required for the secondary batteries for driving motors, lithium ion secondary batteries having high theoretical energy are gaining increasing attention among other types of secondary batteries. The lithium ion secondary batteries are required to store a large amount of electricity in positive electrodes and negative electrodes by unit mass, in order to increase energy density of the lithium ion secondary batteries. The lithium ion secondary batteries highly depend on active materials used in the respective electrodes for fulfillment of such a requirement.

There are known negative electrode materials for lithium ion secondary batteries that achieve a high cycle property while keeping a high discharging capacity (for example, refer to Patent Literature 1). A negative electrode material disclosed in Patent Literature 1 contains several kinds of metallic components and alloy components having predetermined diameters, and fine carbon components having predetermined diameters and lengths.

CITATION LIST

Patent Literature

Patent Literature 1: Japanese Patent No. 4406789

SUMMARY OF INVENTION

However, the lithium ion secondary battery using the negative electrode material described in Patent Literature 1 has a problem of low initial charge-discharge efficiency, which reduces an actual capacity as a battery. Further, there is a problem with such a lithium ion secondary battery that lacks a performance balance with positive electrodes, and there is a problem of great difficulty in preparing raw materials at the time of manufacturing the battery.

The present invention has been accomplished in view of the conventional problem. An object of the present invention is to provide a negative electrode active material for an electric device such as a lithium ion secondary battery capable of improving initial charge-discharge efficiency while keeping a high cycle property. Another object of the present invention is to provide a negative electrode for an electric device, an electric device and a lithium ion secondary battery using such a negative electrode active material.

A negative electrode active material for an electric device according to the aspect of the present invention includes an alloy containing silicon in a range from 25% to 54% exclusive, carbon in a range from 1% to 47% exclusive, zinc in a range from 13% to 69% exclusive in terms of mass ratio, and inevitable impurities as a residue.

DESCRIPTION OF EMBODIMENTS

Hereinafter, a negative electrode active material for an electric device, a negative electrode for an electric device and an electric device according to the present invention will be explained in detail. It should be noted that the symbol "%" represents a percentage by mass unless otherwise specified, and dimensional ratios in the drawings are magnified for convenience of explanation and may be different from actual ratios.

[Negative Electrode Active Material for Lithium Ion Secondary Battery]

A negative electrode active material for an electric device according to the present embodiment includes an alloy containing silicon (Si) with content in the range from 25% by mass to 54% by mass exclusive, carbon (C) with content in the range from 1% by mass to 47% by mass exclusive, zinc (Zn) with content in the range from 13% by mass to 69% by mass exclusive, and inevitable impurities as a residue. These numerical ranges correspond to the area indicated by reference numeral A in FIG. 1.

This negative electrode active material is used for a negative electrode of, for example, a lithium ion secondary battery. The alloy contained in such a negative electrode active material absorbs lithium ions when the battery is charged, and releases the lithium ions when the battery is discharged. The negative electrode active material contains carbon (C) as a first additive element that suppresses amorphous-crystal phase transition so as to extend cycle life when the negative electrode active material is alloyed with lithium by charging. The negative electrode active material further contains zinc (Zn) as a second additive element that acts so that the capacity of the electrode hardly decreases even if the concentration of the first additive element increases. Accordingly, the negative electrode active material of the Si (Si—C—Zn series) alloy according to the present embodiment can ensure a high capacity and cycle durability, and further achieve high charge-discharge efficiency in the initial stage.

If the content of silicon in the negative electrode active material containing the Si—C—Zn series alloy, is less than or equal to 25% by mass, a sufficient initial capacity may not be obtained. If the content of silicon is greater than or equal to 54% by mass, a higher cycle property than that of conventional pure silicon is not expected. In addition, if the content of carbon is less than or equal to 1% by mass, the cycle property obtained is substantially the same as that of pure silicon. If the content of carbon is greater than or equal to 47% by mass, the initial capacity tends to decrease compared to existing negative electrode active materials because the content of silicon relatively decreases. Further, if the content of zinc is less than or equal to 13% by mass, the cycle property is substantially the same as that of pure silicon. If the content of zinc is greater than or equal to 69% by mass, the initial capacity tends to decrease compared to existing negative electrode active materials because the content of silicon decreases.

Figure 2:
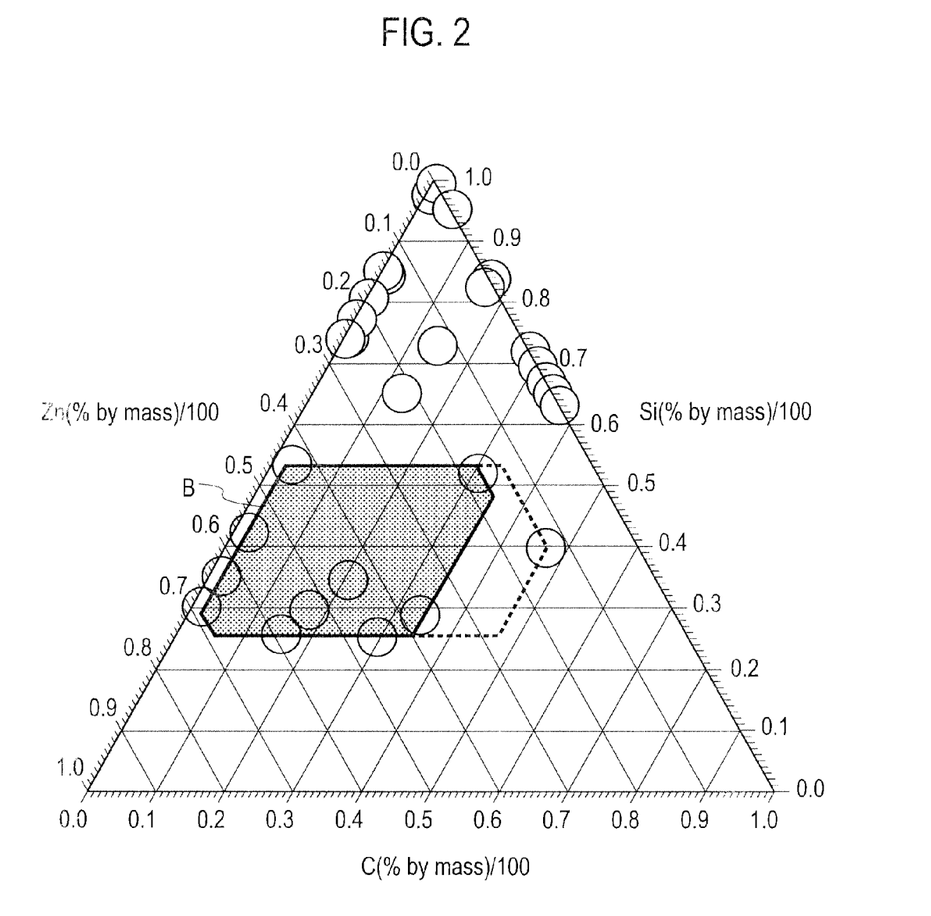
FIG. 2 is a ternary composition diagram showing preferred composition ranges of an Si—C—Zn series alloy included in a negative electrode active material for an electric device according to an embodiment of the present invention.

In order to improve the cycle property of the negative electrode active material, the content of carbon is preferably in the range from 1% by mass to 34% by mass exclusive as indicated by reference numeral B in FIG. 2. Further, the content of zinc is preferably in the range from 17% by mass to 69% by mass exclusive.

Note that the negative electrode active material according to the present embodiment inevitably contains impurities derived from the raw materials and the production method, in addition to the three components described above. The content of the inevitable impurities is preferably less than 0.5% by mass, more preferably less than 0.1% by mass.

As described above, the alloy contained in the negative electrode active material according to the present embodiment contains silicon with content in the range from 25% by mass to 54% by mass exclusive, carbon with content in the range from 1% by mass to 47% by mass exclusive, zinc with content in the range from 13% by mass to 69% by mass exclusive, and inevitable impurities as a residue. Namely, the alloy consists of silicon with content in the range from 25% by mass to 54% by mass exclusive, carbon with content in the range from 1% by mass to 47% by mass exclusive, zinc with content in the range from 13% by mass to 69% by mass exclusive, and inevitable impurities as a residue.

The method for manufacturing the negative electrode active material, that is, the Si—C—Zn series alloy having the above-described composition, is not particularly limited, and a conventionally known method may be used. That is, various manufacturing methods may be used without any particular obstacle, since there is little difference in the conditions and characteristics of the alloy produced by the manufacturing methods. In particular, the thin film alloy having the above-described composition may be obtained by a method such as a multi PVD method (a sputtering method, a resistance heating method and a laser ablation method) and a multi CVD method (a chemical vapor-phase growth method).

The negative electrode may be obtained in a manner such that the alloyed thin film is directly applied to the current collector. The negative electrode obtained in such a manner contributes to simplification of the process. In addition, the negative electrode need not use other components, such as a binder and an electric conductive additive, which constitute the negative electrode active material layer and therefore, the alloyed thin film as the negative electrode active material is simply used as the negative electrode. Accordingly, the negative electrode contributes to a higher capacity and energy density, which satisfy the level suitable for practical used in vehicle, and is desirable to examine electrochemical characteristics of the active material.

The method for manufacturing the thin film alloy may use a multi DC magnetron sputtering apparatus such as an independently controllable ternary DC magnetron sputtering apparatus. Such an apparatus can freely form the Si—C—Zn series alloyed thin film having various alloy compositions and thicknesses, on the surface of the substrate (the current collector). For example, target 1 (Si), target 2 (C) and target 3 (Zn) are used in the ternary DC magnetron sputtering apparatus. The sputtering time is fixed, and the power level of the DC power source is changed to 185 W for silicon, changed in the range from 30 to 90 W for carbon, and changed in the range from 20 to 90 W for zinc. As a result, ternary alloy samples having various composition formulae can be obtained. Note that, since sputtering conditions depend on sputtering devices, it is preferable to estimate appropriate ranges of the sputtering conditions through preliminary tests for each sputtering device.

As described above, the negative electrode active material layer according to the present embodiment may be the Si—C—Zn series alloyed thin film. Alternatively, the negative electrode active material layer may be a layer containing particles of the Si—C—Zn series alloy as a main component. Examples of the method for manufacturing such an alloy in a particle state include a mechanical alloying method and an arc plasma melting method.

When the alloy in the particle state is used as the negative electrode active material, slurry is prepared first in a manner such that a binder, an electric conducting additive and a viscosity control solvent are added to the alloy particles. The slurry thus obtained is applied to the current collector to form the negative electrode active material layer, thereby obtaining the negative electrode. This contributes to mass production and practicality for actual battery electrodes.

When the alloy in the particle state is used as the negative electrode active material, the average particle diameter of the alloy is not particularly limited as long as it is substantially the same as that of conventional negative electrode active materials. However, the average particle diameter may be preferably in the range from 1 μm to 20 μm in view of higher output power. It should be noted that the average particle diameter is not limited to this range, and may be in any other range as long as it can achieve the effect of the present embodiment appropriately.

In the present description, "the particle diameter" represents the greatest length between any two points on the circumference of the active material particle (the observed plane) observed by observation means such as a scanning electron microscope (SEM) and a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may be determined in the same manner.

[Negative Electrode for Electric Device and Electric Device]

Figure 3:
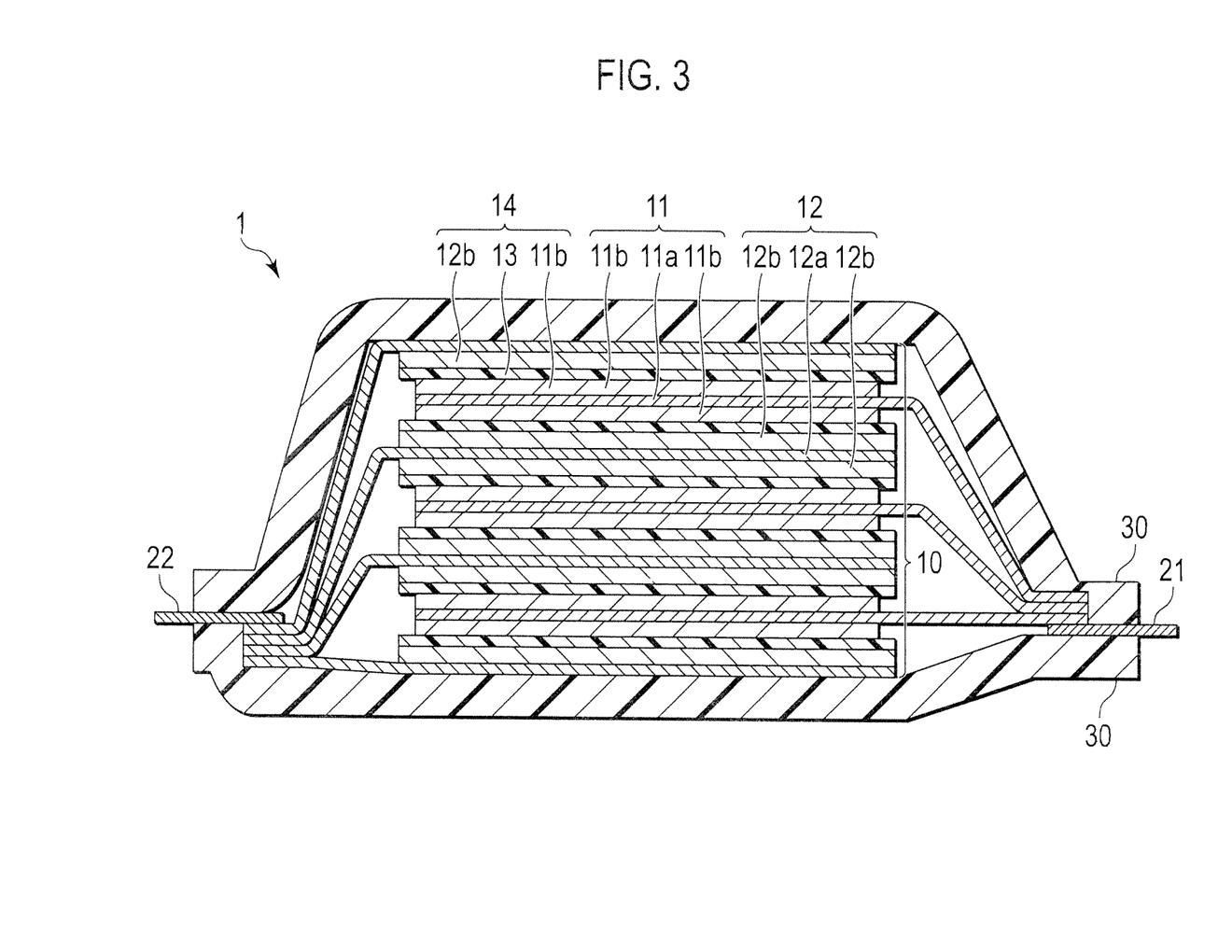
FIG. 3 is a schematic cross-sectional view showing an example of a lithium ion secondary battery according to an embodiment of the present invention.

The negative electrode for an electric device according to the embodiment of the present invention uses the negative electrode active material containing the Si—C—Zn series alloy. Typical examples of the electric device include a lithium ion secondary battery and an electric double layer capacitor. As shown in FIG. 3, the lithium ion secondary battery generally has a structure in which positive electrodes 11 each containing the positive electrode active material applied to the positive electrode current collector and negative electrodes 12 each containing the negative electrode active material applied to the negative electrode current collector, are connected via electrolyte layers 13, and in which the positive electrodes 11, the negative electrodes 12 and the electrolyte layers 13 are housed in an external body. Hereinafter, the constitution of the lithium ion secondary battery and the materials used therein are explained in detail.

(Positive Electrode)

The positive electrodes 11 in the lithium ion secondary battery 1 according to the present embodiment each has a structure in which the positive electrode active material layers 11b are provided on both sides of the positive electrode current collector 11a.

The positive electrode current collector 11a is preferably made from an electrically conductive material such as an aluminum foil, a copper foil, a nickel foil and stainless steel foil. The thickness of the positive electrode current collector 11a is not particularly limited; however, it is generally preferably appropriately in the range from 1 μm to 30 μm.

The positive electrode active material layer 11b contains the electric conducting additive and the binder as necessary, in addition to the positive electrode active material. The content ratio of the positive electrode active material, the electric conducting additive and the binder in the positive electrode active material layer 11b, is not particularly limited.

Examples of the positive electrode active material include a lithium-transition metal composite oxide, a lithium-transition metal phosphate compound, a lithium-transition metal sulfate compound, a solid solution series compound, a ternary series compound, an NiMn series compound, an NiCo series compound and a spinel-manganese series compound.

Examples of the lithium-transition metal composite oxide include $LiMn_2O_4$, $LiCoO_2$, $LiNiO_2$, $Li(Ni, Mn, Co)O_2$, $Li(Li, Ni, Mn, Co)O_2$, $LiFePO_4$ and an oxide in which part of the transition metal contained in each of these composite oxides is substituted with other elements. The lithium-transition metal phosphate compound may be $LiFePO_4$. The lithium-transition metal sulfate compound may be $Li_xFe_2(SO_4)_3$. Examples of the solid solution series compound include $xLiMO_2 \cdot (1-x)Li_2NO_3$ (wherein $0<x<1$, M represents at least one transition metal in an average oxidation state of 3+, and N represents at least one transition metal in an average oxidation state of 4+), and $LiRO_2$—$LiMn_2O_4$ (R represents a transition metal element such as Ni, Mn, Co and Fe). The ternary series compound may be a nickel-cobalt-manganese composite positive electrode material. The NiMn series compound may be $LiNi_{0.5}Mn_{1.5}O_4$. The NiCo series compound may be $Li(NiCo)O_2$. The spinel-manganese series compound may be $LiMn_2O_4$. The positive electrode active material may contain two or more of these materials as necessary. The positive electrode active material is preferably the lithium-transition metal composite oxide in view of high capacity and good output performance.

The particle diameter of the positive electrode active material is not particularly limited; however, it is generally preferably as small as possible. The average particle diameter of the positive electrode active material may be approximately in the range from 1 μm to 30 μm, more preferably approximately in the range from 5 μm to 20 μm, in view of operation efficiency and ease of handling. Here, positive electrode active materials other than the above-described positive electrode active material may be used. In the case that the active materials require different particle diameters in order to achieve their own appropriate effects, the active materials having different particle diameters may be selected and mixed together so as to optimally function to achieve their own effects. Thus, it is not necessary to equalize the particle diameter of all of the active materials.

The binder is added to the positive electrode active material layer 11b to bind the active materials to each other or bind the active material to the positive electrode current collector 11a to keep the electrode structure. The binder may be a thermoplastic resin such as polyvinylidene fluoride (PVDF), polytetrafluoroethylene (PTFE), polyvinyl acetate, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP) and polyacrylonitrile (PAN). The binder may also be thermosetting resin such as epoxy resin, polyurethane resin and urea resin, and a rubber material such as styrene-butadiene rubber (SBR).

The electric conducting additive in the positive electrode active material layer 11b is also referred to as an electric conducting agent added to improve electric conductivity. The electric conducting additive used in the present embodiment is not particularly limited, and a conventionally known agent may be used. Examples of the electric conducting additive include a carbon material such as carbon black (such as acetylene black), graphite and carbon fiber. The addition of the electric conducting additive contributes to improving the battery output performance and the battery reliability due to the improvement in retention of an electrolysis solution, since an electronic network is effectively established inside of the active material layer.

(Negative Electrode)

The negative electrodes 12 each has, as in the case of the positive electrodes 11, a structure in which the negative electrode active material layers 12b are provided on both sides of the negative electrode current collector 12a containing the electrically conductive material. The negative electrode current collector 12a is preferably made from, as in the case of the positive electrode current collector 11a, an electrically conductive material such as an aluminum foil, a copper foil, a nickel foil and stainless steel foil. The thickness of the negative electrode current collector 12a is preferably, as in the case of the positive electrode current collector 11a, appropriately in the range from 1 μm to 30 μm.

The negative electrode active material according to the present embodiment contains, as an essential component, the Si—C—Zn series alloy having the above-described composition. As described above, the negative electrode active material layer 12b according to the present embodiment may be a thin film including the Si—C—Zn series alloy. In this case, the negative electrode active material layer may consist of the Si—C—Zn series alloy, or may contain other negative electrode active materials described below.

Alternatively, as described above, the negative electrode active material layer 12b may contain, as a main component, the particles of the Si—C—Zn series alloy. In this case, the negative electrode active material layer 12b may contain the electric conducting additive and the binder as necessary that can be contained in the positive electrode active material layer 11b. Note that, in the present description, "the main component" represents a component contained in the negative electrode active material layer 12b with content of greater than or equal to 50% by mass.

The lithium ion secondary battery that is the electric device according to the present embodiment uses the negative electrode active material containing the Si—C—Zn series alloy having the above-described composition. However, a conventionally known negative electrode active material capable of reversibly absorbing and releasing lithium may be combined without any particular obstacle as long as the negative electrode active material containing the above-described alloy is contained as an essential component.

The negative electrode active material combined may be a carbon material such as graphite that is highly crystalline carbon (such as natural graphite and artificial graphite), low crystalline carbon (such as soft carbon and hard carbon), carbon black (such as Ketjenblack (registered trademark), acetylene black, channel black, lamp black, oil furnace black and thermal black), fullerene, carbon nanotube, carbon nanofiber, carbon nanohorn and carbon fibril. Examples of the negative electrode active material further include a single substance alloyed with lithium such as Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te and Cl, and an oxide and a carbide containing the elements listed above. Examples of the oxide include silicon monoxide (SiO), $SiO_x$ (0<x<2), tin dioxide ($SnO_2$), $SnO_x$ (0<x<2) and $SnSiO_3$. The carbide may be silicon carbide (SiC). Other examples of the negative electrode active material include a metallic material such as a lithium metal, and a lithium-transition metal composite oxide such as a lithium-titanium composite oxide (lithium titanate: $Li_4Ti_5O_{12}$).

As described above, the negative electrode 12 may be obtained in a manner such that the slurry containing the negative electrode active material together with the electric conducting additive and the binder, is applied to the surface of the negative electrode current collector 12a to form the negative electrode active material layer 12b. Alternatively, the negative electrode 12 may be obtained in a manner such that the thin film of the negative electrode active material alloy is directly provided on the surface of the negative electrode current collector 12a by a multi PVD method or a CVD method.

As described above, the positive electrode active material layer and the negative electrode active material layer are each provided on one side or both sides of the respective current collectors. Alternatively, one current collector may be provided with the positive electrode active material layer on one side, and provided with the negative electrode active material layer on the other side. Electrodes having such a configuration are used for a bipolar battery.

(Electrolyte Layer)

The electrolyte layer 13 contains a non-aqueous electrolyte that functions as a carrier of lithium ions that move between the positive electrodes and the negative electrodes at the time of charging and discharging. The thickness of the electrolyte layer 13 is preferably reduced as much as possible, and is generally approximately in the range from 1 μm to 100 μm, preferably in the range from 5 μm to 50 μm.

The non-aqueous electrolyte contained in the electrolyte layer 13 is not particularly limited as long as it functions as a carrier of lithium ions, and may be a liquid electrolyte or a polymer electrolyte.

The liquid electrolyte is in a state in which lithium salts (electrolyte salts) are dissolved in an organic solvent. The organic solvent may be carbonate such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC) and methyl propyl carbonate (MPC). The lithium salts may be a compound that can be added to the electrode active material layers, such as $Li(CF_3SO_2)_2N$, $Li(C_2F_5SO_2)_2N$, $LiPF_6$, $LiBF_4$, $LiAsF_6$, $LiTaF_6$, $LiClO_4$ and $LiCF_3SO_3$.

The polymer electrolyte is divided into two types; a gel polymer electrolyte (a gel electrolyte) containing an electrolysis solution, and an intrinsic polymer electrolyte not containing an electrolysis solution.

The gel polymer electrolyte preferably has a constitution in which the liquid electrolyte is poured into a matrix polymer (a host polymer) including an ion conductive polymer. The use of the gel polymer electrolyte has the advantage of being able to easily interrupt ion conduction between the respective layers, since there is no fluidity in the electrolyte. The ion conductive polymer used as the matrix polymer (the host polymer) is not particularly limited, and examples thereof include polyethylene oxide (PEO), polypropylene oxide (PPO), polyvinylidene fluoride (PVDF), a copolymer of polyvinylidene fluoride and hexafluoropropylene (PVDF-HFP), polyethylene glycol (PEG), polyacrylonitrile (PAN), polymethyl methacrylate (PMMA), and a copolymer of these compounds.

The ion conductive polymer may be either the same as or different from the ion conductive polymer used as the electrolyte in the active material layers, but is preferably the same. The electrolysis solution (namely, lithium salts and organic solvent) is not particularly limited, and may be the electrolyte salts such as lithium salts and the organic solvent such as carbonate as described above.

The intrinsic polymer electrolyte has constitution in which lithium salts are dissolved in the matrix polymer, but no organic solvent is contained. The use of the intrinsic polymer electrolyte contributes to improving the reliability of the battery, since the risk of liquid leakage from the battery is reduced.

The matrix polymer of the gel polymer electrolyte or the intrinsic polymer electrolyte can exhibit high mechanical strength when a cross-linked structure is formed. The cross-linked structure may be formed in a mariner such that a polymerizable polymer used for polymer electrolyte formation (for example, PEO and PPO) is subjected to polymerization by use of an appropriate polymerization initiator. Examples of the polymerization include thermal polymerization, ultraviolet polymerization, radiation polymerization and electron beam polymerization. The non-aqueous electrolyte contained in the electrolyte layer 13 may be used singly, or two or more kinds thereof may be mixed.

A separator is preferably used in the electrolyte layer 13 when the electrolyte layer 13 contains the liquid electrolyte and the gel polymer electrolyte. The specific configuration of the separator may be a microporous film made from polyolefin such as polyethylene and polypropylene.

(Positive Electrode Tab and Negative Electrode Tab)

As shown in FIG. 3, the lithium ion secondary battery 1 according to the present embodiment has a constitution in which a battery element 10 to which a positive electrode tab 21 and a negative electrode tab 22 are attached, is sealed in an exterior body 30. In the present embodiment, the positive electrode tab 21 and the negative electrode tab 22 are exposed on opposite sides on the outside of the exterior body 30. Note that the positive electrode tab and the negative electrode tab may be exposed on the same side on the outside of the exterior body (not shown in the figure). In addition, the positive electrode tab and the negative electrode tab may be attached to the positive electrode current collectors 11a and the negative electrode current collectors 12a by, for example, ultrasonic welding or resistance welding.

The positive electrode tab 21 and the negative electrode tab 22 are made from a material such as aluminum, copper, titanium, nickel, stainless steel (SUS), or an alloy thereof. However, the material is not limited to these, and may be any conventionally known material used for tabs for lithium ion secondary batteries.

The positive electrode tab 21 and the negative electrode tab 22 may be made from the same material, or may be made from different materials. The tabs may be prepared preliminarily and connected to the positive electrode current collectors 11a and the negative electrode current collectors 12a according to the present embodiment. Alternatively, each of the positive electrode current collectors 11a and the negative electrode current collectors 12a may be extended to form the respective tabs. Each part of the positive electrode tab 21 and the negative electrode tab 22 exposed on the outside of the exterior body 30 is preferably covered with, for example, a heat shrinkable tube having a heat resistant and insulating property (not shown in the figure). This reduces the chances of any negative influence on surrounding products (such as components in a vehicle, in particular, electronic devices) caused by a short circuit because of contact of the positive electrode tab 21 and the negative electrode tab 22 with peripheral devices or wires.

In addition, current collecting plates may be used to extract a current outside of the battery. Such current collecting plates are electrically connected to the current collectors and leads, and exposed on the outside of the exterior body 30. The material constituting the current collecting plates is not particularly limited, and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof, more preferably aluminum or copper in view of lightness, corrosion resistance and high electric conductivity. The positive electrode current collecting plates and the negative electrode current collecting plates may be made from the same material, or may be made from different materials.

(Exterior Body)

The exterior body 30 is preferably made from a film-like exterior material in view of, for example, reduction in size and weight. However, the exterior body 30 is not limited to such a material, and may be a conventionally known material used for exterior bodies for lithium ion secondary batteries. Namely, a metal can casing may be used.

In order that the lithium ion secondary battery can have high output power and cooling performance and can be suitably used as a battery for large devices such as electric vehicles and hybrid electric vehicles, a polymer-metal composite laminated sheet having high thermal conductivity may be used. In particular, an exterior body made from an exterior material such as a laminated film having a three-layer structure in which PP, aluminum and nylon are laminated in this order, may be used.

(Battery Configuration)

As described above, the lithium ion secondary battery according to the present embodiment includes the battery element 10 having a constitution in which plural battery components (electrode structures) 14 each including the positive electrode and the negative electrode connected via the electrolyte layer, are stacked on top of each other. The lithium ion secondary battery has a structure in which the battery element 10 is housed in the exterior body such as a can body or a laminated container.

There are two main types of batteries: a wound type battery having a structure in which the positive electrodes 11, the electrolyte layers 13 and the negative electrodes 12 are wound, and a stacking type battery having a structure in which the positive electrodes 11, the electrolyte layers 13 and the negative electrodes 12 are stacked. The battery shown in FIG. 3 and a bipolar battery correspond to the stacking type battery. There are also so-called coin cells, button batteries and laminated batteries depending on shapes and structures of battery cases.

EXAMPLES

Hereinafter, the present invention is explained in more detail with reference to Example and Comparative Example; however, the present invention is not limited to these examples.

[1] Preparation of Negative Electrode

As a sputtering apparatus, an independently controllable ternary DC magnetron sputtering apparatus (manufactured by Yamato-Kiki Industrial Co., Ltd.; combinatorial sputter coating apparatus; gun-sample distance: about 100 mm) was used. A thin film of a negative electrode active material alloy was formed on a substrate (a current collector) made of a nickel foil having a thickness of 20 μm using this apparatus under the following target and composition conditions. Thus, 29 negative electrode samples including the thin films of the negative electrode active material alloy having compositions shown in Table 1, were obtained (1) Target (manufactured by Kojundo Chemical Laboratory Co., Ltd.; purity: 4N)

Si: diameter of 50.8 mm; thickness of 3 mm (including a backing plate of oxygen-free copper with thickness of 2 mm)

C: diameter of 50.8 mm; thickness of 3 mm (including a backing plate of oxygen-free copper with thickness of 2 mm)

Zn: diameter of 50.8 mm; thickness of 3 mm (2) Film Formation Conditions

Base pressure: up to $7 \times 10^{-6}$ Pa

Sputtering gas: Ar (99.9999% or more)

Sputtering gas introduction amount: 10 sccm

Sputtering pressure: 30 mTorr

DC power source: silicon (185 W), carbon (30 to 90 W), zinc (20 to 90 W)

Pre-sputtering time: 1 min.

Sputtering time: 10 min.

Substrate heating: room temperature (25° C.)

In Example, the Si targets the C target and the Zn target were used, the sputtering time was fixed at 10 minutes, and the power levels of the DC power source were changed for each target within the above-described ranges. Then, alloyed thin films in an amorphous state were formed on Ni substrates, so as to obtain negative electrode samples including the alloyed thin films having various compositions.

As for the sample preparation, for example, in Sample No. 5 (Example), the DC power source 1 (Si target) was set to 185 W, the DC power source 2 (C target) was set to 60 W, and the DC power source 3 (Zn target) was set to 30 W. In Sample No. 22 (Comparative Example), the DC power source 1 (Si target) was set to 185 W, the DC power source 2 (C target) was set to 45 W, and the DC power source 3 (Zn target) was set to 0 W. In Sample No. 26 (Comparative Example), the DC power source 1 (Si target) was set to 185 W, the DC power source 2 (C target) was set to 0 W, and the DC power source 3 (Zn target) was set to 28 W.

Figure 1:
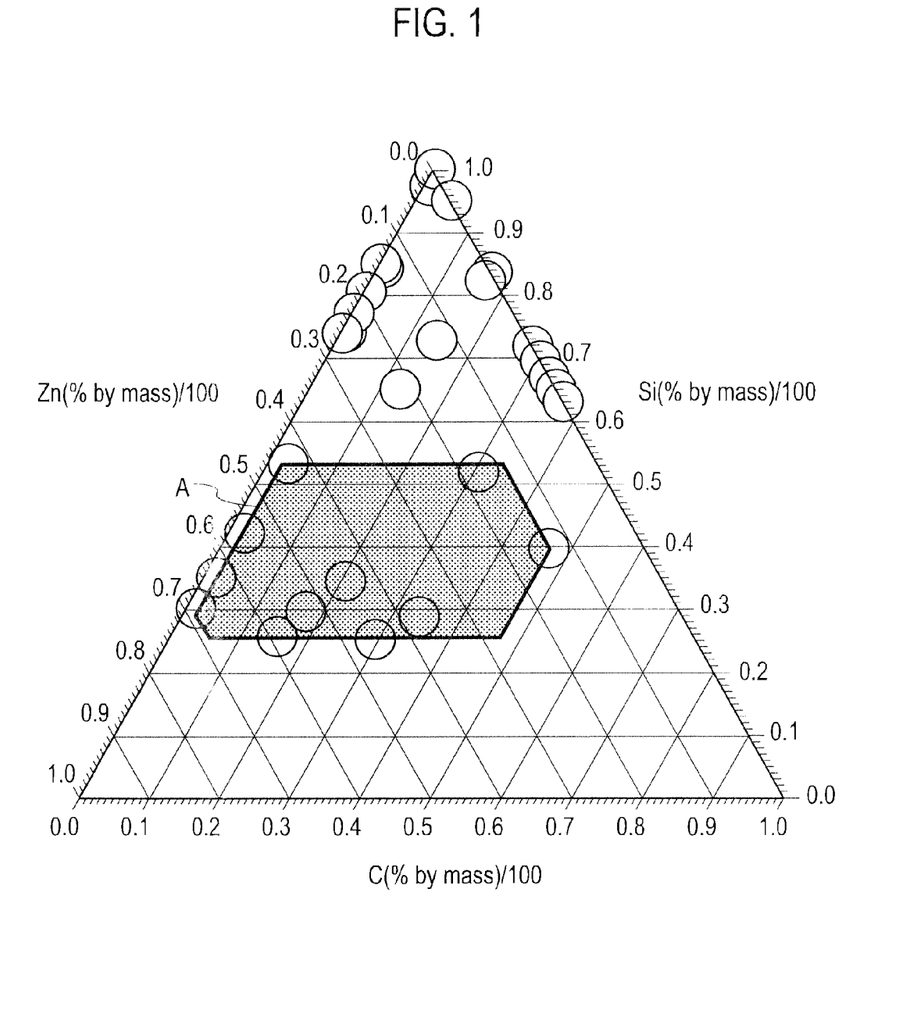
FIG. 1 is a ternary composition diagram showing composition ranges of an Si—C—Zn series alloy included in a negative electrode active material for an electric device according to an embodiment of the present invention, wherein alloy compositions prepared in each example are plotted.

Table 1 and FIG. 1 show constituent compositions of the respective alloyed thin films. The obtained alloy samples were analyzed by using the following analysis method and analysis device.

Composition analysis: SEM-EDX analysis (manufactured by JEOL Ltd.), EPMA analysis (manufactured by JEOL Ltd.)

Film thickness measurement (for calculating sputtering rate): film thickness meter (manufactured by Tokyo Instruments, Inc.)

Film state analysis: Raman spectroscopic analysis (manufactured by Bruker Corporation)

[2] Manufacture of Battery

Each negative electrode sample obtained as described above was placed to face the counter electrode (positive electrode) made of a lithium foil via a separator, and an electrolysis solution was poured therein, so as to prepare a CR2032 type coin cell prescribed in IEC60086 for each sample. The lithium foil was a lithium foil (manufactured by Honjo Metal Co., Ltd.) cut out so as to have a diameter of 15 mm and a thickness of 200 μm. The separator was Celgard 2400 (manufactured by Celgard, LLC.). The electrolysis solution used was prepared in a manner such that LiPF$_6$ (lithium hexafluorophosphate) was dissolved, at a concentration of 1 M, into a mixed non-aqueous solvent in which ethylene carbonate (EC) and diethyl carbonate (EC) were mixed in a volume ratio of 1:1.

[3] Charge-Discharge Test of Battery

A charge-discharge test was performed on each battery obtained as described above. That is, each battery was charged and discharged with a charge-discharge tester in a thermostat bath set at 300 K (27° C.). The charge-discharge tester was HJ0501SM8A (manufactured by Hokuto Denko Corporation), and the thermostat bath was PFU-3K (manufactured by ESPEC Corp.).

the electrode for evaluation. This charge-discharge procedure can be regarded as a single charge-discharge cycle. The charge-discharge test was carried out by repeating the above-described charge-discharge cycle 50 times. Table 1 shows the obtained results. Note that, in Table 1, "Discharging capacity maintenance ratio (%) after 50 cycles" represents a ratio of the discharging capacity at the 50th cycle to the discharging capacity at the 1st cycle ((discharging capacity at 50th cycle)/(discharging capacity at 1st cycle)×100). In addition, "Charge-discharge efficiency" represents a ratio of the discharging capacity to the charging capacity (discharging capacity/charging capacity×100). The charge-discharging capacity was calculated per alloy weight.

TABLE 1

| No. | Negative Electrode Active Material Component (mass %) | | | Initial Charging Capacity (mAH/g) | Discharging Capacity Maintenance Ratio After 50 Cycles (%) | Initial Charge-Discharge Efficiency (%) | Classification |
|---|---|---|---|---|---|---|---|
| | Si | C | Zn | | | | |
| 1 | 53.40 | 2.60 | 44.00 | 1819 | 77 | 100 | Example |
| 2 | 42.45 | 2.07 | 55.48 | 1668 | 74 | 98 | Example |
| 3 | 35.22 | 1.72 | 63.06 | 1378 | 77 | 97 | Example |
| 4 | 30.10 | 1.47 | 68.43 | 1221 | 72 | 97 | Example |
| 5 | 51.95 | 30.37 | 17.68 | 1693 | 75 | 99 | Example |
| 6 | 34.59 | 20.21 | 45.20 | 1326 | 78 | 98 | Example |
| 7 | 29.63 | 17.32 | 53.05 | 1215 | 71 | 98 | Example |
| 8 | 25.92 | 15.15 | 58.93 | 1129 | 74 | 98 | Example |
| 9 | 39.85 | 46.59 | 13.57 | 1347 | 69 | 99 | Example |
| 10 | 28.77 | 33.63 | 37.60 | 1103 | 79 | 98 | Example |
| 11 | 25.26 | 29.53 | 45.21 | 1059 | 72 | 98 | Example |
| 12 | 97.73 | 0.48 | 1.79 | 3099 | 48 | 89 | Comparative Example |
| 13 | 84.44 | 0.41 | 15.15 | 2752 | 52 | 90 | Comparative Example |
| 14 | 74.33 | 0.36 | 25.31 | 2463 | 53 | 89 | Comparative Example |
| 15 | 82.56 | 15.93 | 1.51 | 2601 | 59 | 90 | Comparative Example |
| 16 | 72.87 | 14.06 | 13.07 | 2483 | 68 | 90 | Comparative Example |
| 17 | 65.22 | 12.58 | 22.20 | 2136 | 55 | 90 | Comparative Example |
| 18 | 100.00 | 0.00 | 0.00 | 3232 | 47 | 91 | Comparative Example |
| 19 | 95.36 | 4.64 | 0.00 | 3132 | 58 | 92 | Comparative Example |
| 20 | 83.69 | 16.31 | 0.00 | 2778 | 64 | 91 | Comparative Example |
| 21 | 71.96 | 28.04 | 0.00 | 2388 | 51 | 91 | Comparative Example |
| 22 | 69.52 | 30.48 | 0.00 | 2370 | 68 | 91 | Comparative Example |
| 23 | 67.24 | 32.76 | 0.00 | 2295 | 54 | 91 | Comparative Example |
| 24 | 65.11 | 34.89 | 0.00 | 2240 | 32 | 87 | Comparative Example |
| 25 | 63.11 | 36.89 | 0.00 | 2120 | 59 | 91 | Comparative Example |
| 26 | 85.15 | 0.00 | 14.85 | 2618 | 76 | 88 | Comparative Example |
| 27 | 80.83 | 0.00 | 19.17 | 2268 | 70 | 87 | Comparative Example |
| 28 | 77.15 | 0.00 | 22.85 | 2123 | 74 | 87 | Comparative Example |
| 29 | 73.97 | 0.00 | 26.03 | 2640 | 80 | 89 | Comparative Example |

Each battery was charged at 0.1 mA from 2 V to 10 mV at the constant current/constant voltage mode during charging, that is, in the process of Li intercalation to the negative electrode for evaluation. After that, each battery was discharged at 0.1 mA from 10 mV to 2 V at the constant current mode during discharging, that is, in the process of Li release from As is apparent from Table 1, the batteries of Sample No. 1 to Sample No. 11 according to Example have a better balance between the initial charge-discharge efficiency and the discharging capacity maintenance ratio. In particular, as shown in FIG. 2, the test revealed that the batteries containing Si in the range from 25% by mass to 54% by mass exclusive, C in the range from 1% by mass to 34% by mass exclusive and Zn in the range from 17% by mass to 69% by mass exclusive, achieved better results. The test also revealed that, compared to the batteries of Example, the batteries of Sample No. 12 to Sample No. 29 according to Comparative Example showed a significant decrease in the initial charge-discharge efficiency and/or the discharging capacity maintenance ratio even though the initial charging capacity was high.

The entire contents of Japanese Patent Application No. P2011-050314 (filed on Mar. 8, 2011) and Japanese Patent Application No. P2011-117073 (filed on May 25, 2011) are herein incorporated by reference.

Although the present invention has been described above by reference to Example, the present invention is not limited to the descriptions thereof, and it will be apparent to those skilled in the art that various modifications and improvements can be made.

Industrial Applicability

The present invention uses, as the negative electrode active material for an electric device, the Si—C—Zn ternary alloy having the above-described composition ranges. The electric device, such as a lithium ion secondary battery, using this negative electrode active material can improve the initial charge-discharge efficiency while keeping the cycle property.

REFERENCE SIGNS LIST

1 Lithium ion secondary battery
10 Battery element
11 Positive electrode
12 Negative electrode
12*a* Negative electrode current collector
12*b* Negative electrode active material layer
13 Electrolyte layer
30 Exterior body

The invention claimed is:

1. A negative electrode active material for an electric device, comprising an alloy consisting of silicon in a range from 25% to 54% exclusive, carbon in a range from 1% to 47% exclusive, zinc in a range from 13% to 69% exclusive in terms of mass ratio, and inevitable impurities as a residue.

2. The negative electrode active material for an electric device according to claim 1, wherein the alloy consists of silicon in a range from 25% to 54% exclusive, carbon in a range from 1% to 34% exclusive, zinc in a range from 17% to 69% exclusive in terms of mass ratio, and inevitable impurities as a residue.

3. A negative electrode for an electric device, comprising the negative electrode active material according to claim 1.

4. An electric device comprising the negative electrode active material according to claim 1.

5. An electric device comprising the negative electrode according to claim 3.

6. The electric device according to claim 4 that is a lithium ion secondary battery.

* * * * *